United States Patent [19]

Gill et al.

[11] Patent Number: 4,901,975
[45] Date of Patent: Feb. 20, 1990

[54] FLUID DELIVERY EQUIPMENT

[75] Inventors: David C. Gill, Keynsham; Gary K. Pressey, Mangotsfield, both of Great Britain

[73] Assignee: Nomix Manufacturing Company Limited, Bristol, United Kingdom

[21] Appl. No.: 221,285

[22] Filed: Jul. 19, 1988

[30] Foreign Application Priority Data

Jul. 20, 1987 [GB] United Kingdom ................. 8717046

[51] Int. Cl.4 .............................................. F16K 51/00
[52] U.S. Cl. ...................................... 251/148; 174/47; 239/224; 239/600; 439/191
[58] Field of Search .................. 174/47; 239/224, 530, 239/600, 703; 439/191, 192, 194; 251/148

[56] References Cited

U.S. PATENT DOCUMENTS

| | | | |
|---|---|---|---|
| 360,925 | 4/1887 | Solano | 439/192 |
| 2,109,511 | 3/1938 | Simon | 174/47 X |
| 2,388,445 | 11/1945 | Stewart . | |
| 2,811,674 | 10/1957 | Smith | 174/47 X |
| 2,883,513 | 4/1959 | Schnabel | 174/47 X |
| 3,097,288 | 7/1963 | Dunlap | 174/47 X |
| 3,184,113 | 5/1965 | Curtis . | |
| 3,452,931 | 7/1969 | Knowles . | |
| 3,539,103 | 11/1970 | Marsh | 174/47 X |
| 3,741,244 | 6/1973 | Ise . | |
| 3,749,814 | 7/1973 | Pratt | 174/47 |
| 4,083,497 | 4/1978 | Rosenberger . | |
| 4,107,452 | 8/1978 | Razvi . | |
| 4,276,903 | 7/1981 | Spohr . | |
| 4,401,326 | 8/1983 | Blair . | |
| 4,487,437 | 12/1984 | Dickirson . | |
| 4,609,148 | 9/1986 | Gill | 239/224 |

FOREIGN PATENT DOCUMENTS

| | | |
|---|---|---|
| 0086030 | 8/1983 | European Pat. Off. . |
| 110713 | 6/1984 | European Pat. Off. . |
| 2300627 | 7/1974 | Fed. Rep. of Germany . |
| 2919243 | 11/1980 | Fed. Rep. of Germany . |
| 3109583 | 10/1982 | Fed. Rep. of Germany . |
| 2351709 | 12/1977 | France . |
| 2362673 | 3/1978 | France . |
| 106120 | 8/1951 | New Zealand . |
| 114427 | 6/1955 | New Zealand . |
| 120056 | 11/1958 | New Zealand . |
| 150941 | 12/1967 | New Zealand . |
| 148193 | 4/1969 | New Zealand . |
| 179125 | 5/1977 | New Zealand . |
| 583398 | 12/1976 | Switzerland . |
| 901969 | 7/1962 | United Kingdom . |
| 1046065 | 10/1966 | United Kingdom . |
| 2045883 | 11/1980 | United Kingdom . |
| 2091365 | 7/1982 | United Kingdom . |
| 2131327 | 6/1984 | United Kingdom . |
| 2136321 | 9/1984 | United Kingdom . |
| 2160279 | 12/1985 | United Kingdom . |

Primary Examiner—Gerald A. Michalsky
Attorney, Agent, or Firm—Merchant, Gould, Smith, Edell, Welter & Schmidt

[57] ABSTRACT

Two components, such as a support tube and handset of a herbicide delivery lance, are interconnected in a manner which provides an electrical connection between leads in the tube and the handset respectively. Fluid communication is also provided between a flexible tube in the tube and a passage of the handset. The leads on the tube are connected to two terminal plates situated on the outer surface of the tube. These terminal plates move into positions opposite bosses on a sleeve provided on the handset when the tube is pushed into the sleeve. Screws, engaging bushes accommodated in the bosses, are then screwed into contact with the terminal plates to secure the tube in position. The screws also complete the electrical circuit between the leads. One of the components includes a valve which includes an operating member. Displacement of the operating member against the action of a spring not only opens the valve, but also actuates an electrical switch.

8 Claims, 3 Drawing Sheets

FLUID DELIVERY EQUIPMENT

This invention relates to fluid delivery equipment, and particularly, although not exclusively, to a coupling for connecting two components together in such a way that an electrical connection is made between electrical leads carried by the two components. The invention is particularly, although not exclusively, concerned with such couplings in which fluid passageways in the two components are also connected together in a fluid-tight manner. The present invention also relates to a valve suitable for use in fluid delivery equipment.

There exist hand-held lances for delivering herbicide which comprise a handset and a delivery head which is connected to the handset by a tubular support. The handset is held by the operator, and the tubular support enables him to position the delivery head just above the ground to be treated.

In a known form of such a lance, the tubular support accommodates not only an internal, flexible tube for conveying the herbicide from the handset to the delivery head, but also electrical leads for the supply of power to an operating motor contained within the head. The support is manufactured as a separate component from the handset, and consequently, in connecting the support to the handset, three conditions must be satisfied: firstly, the connection must be rigid so that the support and the handset move as a unit; second, the connection between the flexible tube and the ducting within the handset must be made in a fluid-tight manner; and thirdly, the electrical leads must be connected to a source of electrical power. This source of electrical power may be a battery housed either in the handset or in a backpack carried by the operator.

In the known lance, the electrical connections are made separately from the process of fitting the support to the handset. The connection between the support and the handset is made by screwing the support into the handset to achieve a fluid-tight seal between the flexible tube and the ducting in the handset. This seal is made between surfaces extending transversely of the length of the support, and a sealing element in the form of a washer may be provided between these surfaces. The electrical leads emerge through a hole in the wall of the support for connection to the power source.

According to one aspect of the present invention there is provided a coupling between first and second components which are each provided with electrical leads and fluid passageways for conveying a liquid, the components being telescopically engageable with each other to bring the respective fluid passageways into communication with each other, the first component being provided with an electrically conductive element to which the lead of the first component is connected, the second component also having an electrically conductive element, to which the lead of the second component is connected, the components being secured together in the engaged position by an electrically conductive securing element which makes electrical contact with both of the conductive elements thereby to connect the leads to each other.

When the present invention is applied to a lance for delivering herbicide, the first component will be the tubular support, while the second component will be part of the handset. For example, the second component may comprise a valve assembly of the handset. Normally in these circumstances, the first component will be made from an electrically insulating material, and there will be two leads in each of the components.

The electrically conductive element or elements of the first component may be accommodated in recesses in the outer surface of the first component. The or each lead will then pass through the wall of the first component and be connected, for example by soldering, to the conductive element in the recess.

The conductive element of the second component may comprise a bush, which may be internally screwthreaded to receive a screwthreaded fastener serving as the securing element.

Where the coupling is to carry fluids, as, for example, in a herbicide lance, the components may have fluid passageways which, when the components are engaged together, make fluid-tight contact with each other. For example, the passageway in the first component may comprise a tube provided with an end fitting which is sealingly received within a bore provided at the end of the passageway in the second component. By providing the sealing engagement at a longitudinal surface, the need to maintain the two components pressed axially together is avoided. The second component may be provided with a valve for controlling the flow of fluid through the passageways.

According to another aspect of the present invention, there is provided a valve comprising a body having two aligned bores of different diameter, and an inlet and an outlet aperture, each opening into a different one of the bores, a closure member being provided which is sealingly engageable with a transition surface between the bores, the closure member being connected to an operating member for displacing the closure member to open and close the valve, the valve including an adjustable electrical component and the operating member having an operating rod which extends from the closure member in a direction away from the transition surface to operate the electrical component upon displacement of the operating member.

For a better understanding of the present invention, and to show how it may be carried into effect, reference will now be made, by way of example, to the accompanying drawings, in which.

Figure 1:
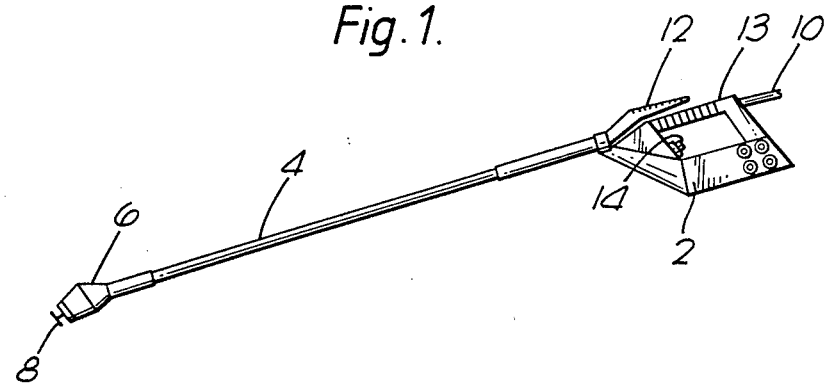
FIG. 1 shows a lance for delivering herbicides.

The lance shown in FIG. 1 comprises a handset 2 from which extends a rigid support member in the form of a tube 4. The tube 4 carries a delivery head 6 which accommodates an electric motor (not shown) for driving a distribution element 8 in the form of a spinning disc.

A tube 10 extends from the handset 2 for connection to a container of herbicide. The handset 2 is also provided with a valve (not visible in FIG. 1) which can be operated by means of a trigger 12. A battery providing the source of power for the motor in the head 6 is accommodated in the handset 2, and the voltage applied to the motor in the head 6 can be controlled, in order to control the speed of the disc 8, by means of a control knob 14.

In use of the equipment shown in FIG. 1, herbicide flows through the tube 10, the handset 2 and the tube 4 to the head 6. From the head 6, the herbicide flows at a metered rate to the spinning disc 8 which discharges the herbicide by centrifugal force to form droplets which fall onto the ground to be treated.

Figure 2:
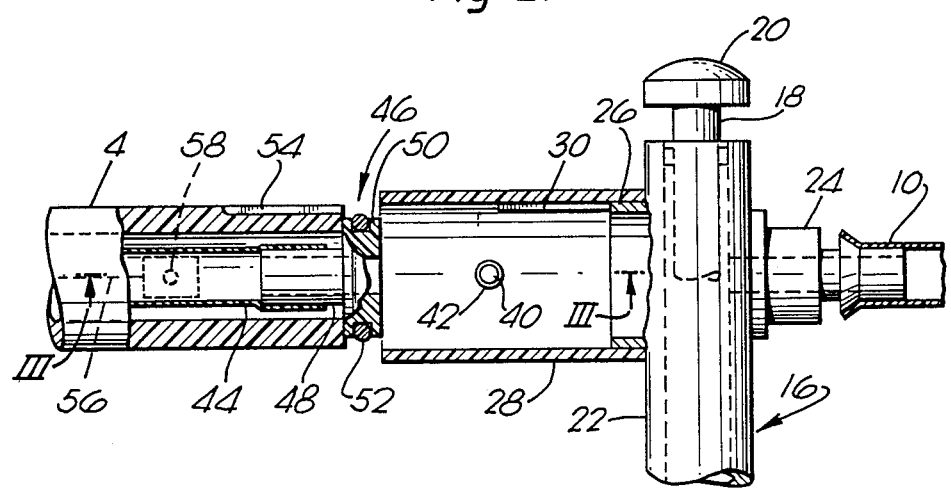
FIG. 2 is an exploded view, on an enlarged scale, of part of the lance of FIG. 1.
Figure 3:
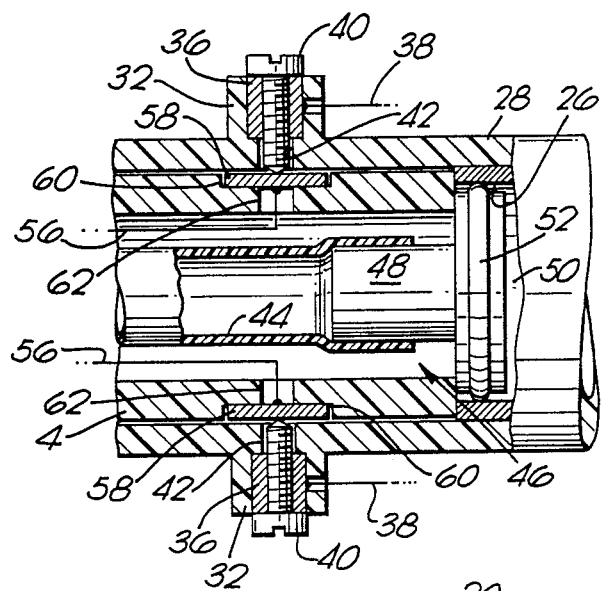
FIG. 3 is a sectional view taken on the line III—III in FIG. 2, showing the assembled configuration.

FIGS. 2 and 3 represent the region of connection between the tube 4 and the handset 2. The handset 2 is represented by a valve 16 which has an operating member 18 provided with a head 20 which is acted upon by the trigger 12 shown in FIG. 1. The valve has a body 22 from which projects a spigot 24 on which the tube 10 is fitted. The body 22 also has an outlet connector 26 on which a sleeve 28 is fitted. The inner wall of the sleeve 28 is provided with a rib 30.

The sleeve 28 has two outwardly projecting, oppositely disposed, bosses 32. Each boss has a central bore 34 in which a bush 36 is accommodated. Each bush is made from an electrically conductive material, such as brass, and has attached to it a lead 38. The leads 38 are connected at their opposite ends to the control device operated by the control knob 14.

The bushes 36 are internally screwthreaded and receive screws 40. These screws 40 extend through an opening 42 in the wall of the sleeve 28 to emerge into the interior of the sleeve 28.

The tube 4 accommodates a flexible inner tube 44, the purpose of which is to convey herbicide to the head 6. At the end of the tube 44 shown in FIG. 2, there is provided an end fitting 46. This fitting 46 has a spigot 48 which receives the tube 44 and an enlarged head 50 which carries and O-ring 52.

At its end region, the tube 4 has a longitudinal groove 54 which corresponds to the rib 30 in the sleeve 28.

Two leads 56 extend through the interior of the tube 4 from the motor in the head 6 to a terminal plate 58. Each terminal plate 58 is accommodated in a correspondingly-shaped recess 60 in the outer surface of the tube 4, the lead 56 passing through an opening 62.

In order to connect together the two components, the groove 54 is aligned with the rib 30, and the tube 4 is pushed into the sleeve 28. The two components thus engage one another telescopically, and eventually the head 50 of the fitting 46 will enter the connector 26. The O-ring 52 will provide a fluid-tight seal between the tube 44 and the interior of the connector 26, so connecting the tube 44, via the valve 16, to the tube 10.

When the tube 4 has been pushed fully home into the sleeve 28, the terminal plates 58 will be disposed opposite the screws 40, as shown in FIG. 3. These screws can then be tightened down onto the terminal plates 58, so completing the electrical circuit constituted by each lead 56, its terminal plate 58, the screw 40, the bush 36 and the lead 38. At the same time, the screws 40 will secure the tube 4 within the sleeve 28. To provide added security, the terminal plates 58 may be provided with inwardly directed depressions or recesses into which the screws 40 enter.

It will be appreciated that the tube 4 itself and the sleeve 28 are made from material which is an electrical insulator, for example plastics material.

Figure 4:
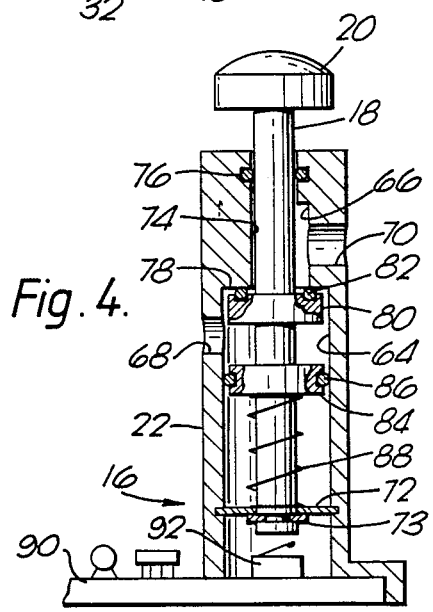
FIG. 4 is a sectional view of a valve for use with the lance.

The valve 16 is shown in more detail in FIG. 4. The body 22 is provided with two aligned bores 64 and 66, the bore 66 having a smaller diameter than the bore 64. An inlet aperture 68 opens into the bore 64, and an outlet aperture 70 opens into the bore 66.

The operating member 18 extends through the bores 66 and 64 and, at its lower end (as seen in FIG. 4), extends through a retainer 72, which is fixed axially with respect to the body 22. Upwards movement of the operating member 18 is limited by a circlip 73 which abuts the retainer 72. The retainer 72 may be in two interlocking parts which are separately inserted through two diametrically opposite slots (not shown) in the body 22 to surround the operating member 18. The operating member 18 emerges from the top end of the body 22 through an opening 74. An O-ring 76 is provided to prevent leakage from the bore 66 past the operating member 18.

There is a transversely extending transition 78 between the bores 64 and 66. As shown in FIG. 4, the transition 78 is perpendicular to the longitudinal axis of the operating member 18, but it could also be inclined. Adjacent the transition 78, the operating member 18 carries a closure member 80 which is provided with a sealing ring 82 for engagement with the transition 78. Some distance below the closure member 80, the operating member 18 carries a stop member 84, which has a sealing ring 86 engaging the bore 64. The stop member 86 is positioned below the aperture 68 in all operative positions of the valve 16.

A spring 88 acts between the retainer 72 and the stop member 84 in order to bias the closure member 80 into abutment with the transition 78.

In the position shown in FIG. 4, the operating member 18 is biased upwardly by the spring 88 so that the sealing ring 82 makes fluid-tight contact with the transition 78. Fluid entering the bore 66 through the inlet aperture 70 is thus prevented from flowing into the bore 64 and thence through the outlet aperture 68. However, when the head 20 is depressed, by operation of the trigger 12 (FIG. 1), the operating member 18 is moved against the action of the spring 88, and the closure member 80 moves away from the transition 78. Fluid flowing through the aperture 70 into the bore 66 can then flow past the closure member 80 into the bore 64, and thence through the outlet aperture 68.

An advantage of the valve construction shown in FIG. 4 is that none of the sealing rings 76, 82, 86 passes across the mouth of an aperture during operation. Thus, the danger of the sealing rings being damaged during operation is reduced.

A printed circuit board 90 is provided at the bottom of the body 22, carrying control circuitry for controlling the motor in the head 6. The circuit board includes a microswitch 92 which is operable upon displacement of the operating member 18. Thus, depression of the head 20 serves not only to open the valve 16, but also to supply power to the motor through the leads 56.

Figure 5:
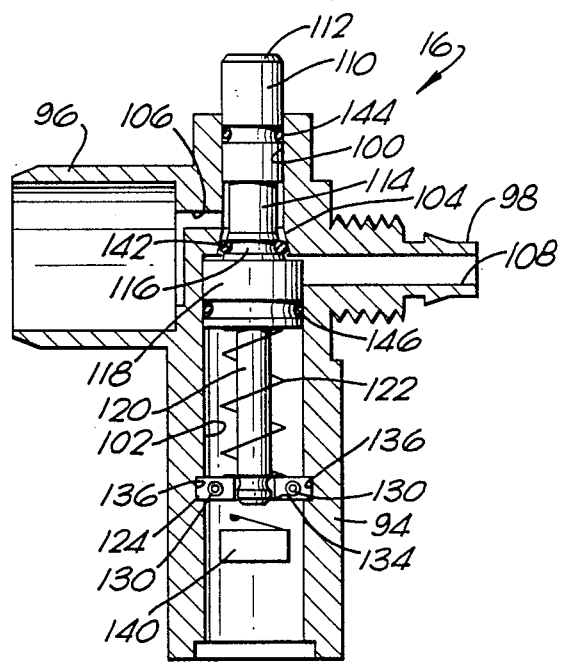
FIG. 5 is a sectional view of another embodiment of a valve.
Figure 6:
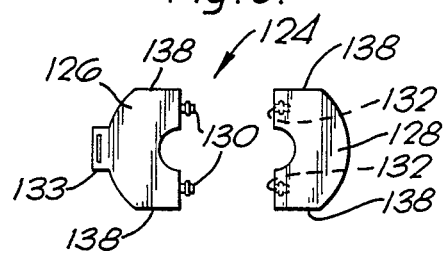
FIG. 6 shows two components of the valve of FIG. 5.

A further embodiment of the valve 16 is shown in FIGS. 5 and 6. This valve comprises a body 94 having a collar 96 for receiving the head 50 of the supply duct 44. The body 94 also has an outlet spigot 98 for receiving the tube 10. The interior of the body 94 comprises a first bore 100 and a larger, second bore 102. At the transition between the bores 100 and 102 there is a frusto-conical transition surface 104. An outlet duct 106 extends eccentrically from the interior of the collar 96 into the smaller diameter bore 100, and an inlet duct 108 extends through the spigot 98 from the larger diameter bore 102 at a position adjacent the transition surface 104.

An operating member 110 is disposed within the bores 100 and 102. The operating member 110 has an actuating head 112 for engagement by the trigger 12 to operate the valve 16. The operating head 112 is connected by a stem 114 and a frusto-conical portion 116 to a spool 118, from which extends an operating rod 120. A spring 122 extends around the operating rod 120 and acts between the spool 118 and a retainer 124. As shown in FIG. 6, the retainer 124 is a two-part component, comprising a male part 126 and a female part 128. The male part 126 has two spigots 130 which, when the retainer 124 is assembled, engage within recesses 132 in the female part 128. The male part 126 has a lug 133 to assist removal of the retainer 124 when dismantling the valve 16.

The body 94 has a through slot 134, defined between parallel side walls 136. To assemble the valve, the operating member 110 is inserted from below, as shown in FIG. 5, and the spring 122 is then fitted over the operating rod 120 and compressed by any suitable means. The two components 126 and 128 of the retainer 124 are then inserted from opposite sides of the slot 134 to surround the operating rod 120. The two components 126 and 128 are retained together by cooperation between the spigots 130 and the recesses 132. During insertion, the components 126 and 128 are guided towards one another by cooperation between side surfaces 138 and the surfaces 136 of the slot 134.

A printed circuit board, corresponding to the circuit board 90 in FIG. 4, is fitted to the lower end of the valve 16 of FIG. 5, this circuit board being provided with a microswitch 140.

In the position shown in FIG. 5, the valve 16 is closed. A sealing ring 142 provided on the frustoconical portion 116 makes sealing engagement with the transition region 104 in the body 94, so preventing flow of fluid from the inlet 108 to the outlet 106. Depression of the operating member 110, by means of the trigger 12 (FIG. 1) moves the sealing ring 142 away from the transition region 104, and permits the flow of fluid through the valve. At the same time, the resulting downwards movement of the operating rod 120 causes actuation of the microswitch 140, so energising the motor in the spraying head 6, to rotate the disc 8. Sealing rings 144 and 146 prevent undesired leakage of the fluid through the bores 100 and 102 respectively.

We claim:

1. A coupling between first and second components which are each provided with electrical leads and fluid passageway for conveying a liquid, the components being telescopically engageable with each other to bring the respective fluid passageways into communication with each other, the first component being provided with an electrically conductive element to which the lead of the first component is connected, the second component having an electrically conductive internally screwthreaded bush, to which the lead of the second component is connected, the components being secured together in the engaged position by an electrically conductive screwthreaded fastener which makes electrical contact with both the electrically conductive element and the electrically conductive bush thereby to connect the leads to each other.

2. A coupling as claimed in claim 1, in which the first component comprises a main body made from an electrically insulating material, the conductive element of the first component being situated adjacent an exposed surface of the main body.

3. A coupling as claimed in claim 2, in which the conductive element is received in a recess formed in the exposed surface of the main body.

4. A coupling as claimed in claim 2, in which the main body is tubular and in which the electrical lead extends within the interior of the main body, an end portion of the lead passing through the wall of the main body to the conductive element.

5. A coupling as claimed in claim 1, in which the fluid passageway of the first component comprises a tube having an end fitting for fluid tight engagement with the passageway in the second component.

6. A coupling as claimed in claim 5, in which sealing engagement is achieved between the outer periphery of the end fitting and the inner surface of a bore at the end of the passageway of the second component.

7. A coupling as claimed in claim 1, in which the passageway of the second component comprises a valve.

8. A coupling as claimed in claim 7, in which the valve comprises a body having two aligned bores of different diameter, and an inlet and an outlet aperture, each opening into a different one of the bores, a closure member being provided which is sealingly engageable with a transition surface between the bores, the closure member being connected to an operating member, for displacing the closure member to open and close the valve.

* * * * *